US010296571B2

(12) United States Patent
Kosonen

(10) Patent No.: US 10,296,571 B2
(45) Date of Patent: *May 21, 2019

(54) METHOD, SYSTEM, APPARATUS, NETWORK ENTITY AND COMPUTER PROGRAM PRODUCT FOR PROVIDING A USER WITH AN EDITABLE WEBPAGE

(71) Applicant: NOKIA CORPORATION, Es (FI)

(72) Inventor: Timo Kosonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 728 days.

This patent is subject to a terminal disclaimer.

(21) Appl. No.: 14/465,294

(22) Filed: Aug. 21, 2014

(65) Prior Publication Data

US 2014/0365871 A1 Dec. 11, 2014

Related U.S. Application Data

(63) Continuation of application No. 11/751,835, filed on May 22, 2007, now Pat. No. 8,838,728.

(51) Int. Cl.
*G06F 17/24* (2006.01)
*H04L 29/08* (2006.01)
(Continued)

(52) U.S. Cl.
CPC ............ *G06F 17/24* (2013.01); *G06F 16/958* (2019.01); *G06F 16/9577* (2019.01);
(Continued)

(58) Field of Classification Search
None
See application file for complete search history.

(56) References Cited

U.S. PATENT DOCUMENTS 5,524,196 A * 6/1996 Blades .................. G06F 3/0482
715/834
6,769,010 B1 * 7/2004 Knapp .............. G06F 17/30867
707/E17.109
(Continued)

OTHER PUBLICATIONS

Greenlight Wireless, "Skweezer," http://www.greenlightwireless.net/skweezer/default.aspx, pp. 1-2, retrieved Feb. 7, 2008.
(Continued)

Primary Examiner — Azizul Choudhury
(74) Attorney, Agent, or Firm — Alston & Bird LLP

(57) ABSTRACT

In general, a method, system, apparatus, network entity and computer program product are provided for presenting to a user an editable webpage corresponding to virtually any non-editable webpage that is capable of being accessed by the user. The web browser operating on the user's device may be modified, either directly or through a plug-in, in order to automatically provide an editable webpage for each URI input by the user. When a user inputs a URI associated with a webpage he/she would like to visit, his or her browser may automatically send a request to an indexing web server for an editable page associated with the input URI. The indexing web server may access a mapping of URIs to editable web pages, and provide the browser with the URI for the corresponding editable web page. The browser may then provide two views to the user (simultaneously or in such a manner that the views can be toggled), a main view including the requested, non-editable webpage, and an editable view including the publicly editable web page associated with the input URI.

35 Claims, 5 Drawing Sheets

(51) Int. Cl.
*G06F 16/957* (2019.01)
*G06F 16/958* (2019.01)

(52) U.S. Cl.
CPC ............ *G06F 16/972* (2019.01); *H04L 67/02* (2013.01); *H04L 67/306* (2013.01)

(56) References Cited

U.S. PATENT DOCUMENTS

| | | | | |
|---|---|---|---|---|
| 6,983,287 | B1* | 1/2006 | Jayanti | G06F 17/30038 |
| 6,985,950 | B1* | 1/2006 | Hanson | G06F 17/30601 |
| | | | | 707/999.003 |
| 7,254,593 | B2* | 8/2007 | Albornoz | G06F 17/30997 |
| | | | | 707/695 |
| 7,433,876 | B2* | 10/2008 | Spivack | G06F 17/3089 |
| 7,581,173 | B1* | 8/2009 | Ferguson | G06F 17/30899 |
| | | | | 715/235 |
| 2002/0059341 | A1* | 5/2002 | Harrison | G06Q 30/02 |
| | | | | 715/255 |
| 2002/0073125 | A1* | 6/2002 | Bier | G06F 17/24 |
| | | | | 715/255 |
| 2003/0023632 | A1* | 1/2003 | Ries | G06F 17/3089 |
| | | | | 715/235 |
| 2003/0220885 | A1* | 11/2003 | Lucarelli | G06Q 30/06 |
| | | | | 705/64 |
| 2006/0236261 | A1* | 10/2006 | Forstall | G06F 3/0485 |
| | | | | 715/784 |
| 2007/0130164 | A1* | 6/2007 | Kembel | G06F 17/3089 |
| 2009/0257595 | A1 | 10/2009 | De Cesare et al. | |

OTHER PUBLICATIONS

Alexa Web Search, "*Alexa Toolbar Quick Tour*," http://www.alexa.com/site/download/quicktour?show=, pp. 1-3, retrieved Feb. 7, 2008.
Wikipedia: About—Wikipedia, the free encyclopedia, "*Wikipedia: About*," http://en.wikipedia.org/wiki/Wikipedia:About, pp. 1-15, retrieved Feb. 7, 2008.
Arrington M., Google Steps Where Many Have Stumbled: Sidewiki, Sep. 23, 2009. Accessed; Apr. 30, 2010, http://techcrunch.com/2009/09/23/google-steps-where-many-have-stumbled-sidewiki/, pp. 1-2.
Office Action for U.S. Appl. No. 11/751,835 dated Feb. 28, 2014.
Office Action for U.S. Appl. No. 11/751,835 dated Sep. 13, 2012.
Office Action for U.S. Appl. No. 11/751,835 dated Dec. 30, 2009.
Office Action for U.S. Appl. No. 11/751,835 dated May 8, 2013.
Office Action for U.S. Appl. No. 11/751,835 dated Aug. 5, 2010.
Advisory Action for U.S. Appl. No. 11/751,835 dated Jul. 15, 2013.
Notice of Allowance for U.S. Appl. No. 11/751,835 dated Jul. 18, 2014.

* cited by examiner

METHOD, SYSTEM, APPARATUS, NETWORK ENTITY AND COMPUTER PROGRAM PRODUCT FOR PROVIDING A USER WITH AN EDITABLE WEBPAGE

CROSS REFERENCE TO RELATED APPLICATIONS

This application is a continuation application of U.S. Application Ser. No. 11/751,835, filed May 22, 2007, the entirety of which is incorporated herein.

FIELD

Exemplary embodiments of the invention relate, generally, to browsing webpages on a communications network and, in particular, to providing an editable webpage corresponding to virtually any non-editable webpage.

BACKGROUND

While there are some services, such as Wikipedia, Alexa Toolbar, Skweezer, and the like, that provide a user with a modicum of input as to the content and/or presentation of certain websites or webpages, the majority of current websites can only be viewed (i.e., they cannot be edited or modified). In addition, the services that are available are limited in what they enable a user to do. For example, Wikipedia, which provides a variety of encyclopedia-like webpages that can be created and modified by users, only allows users to edit Wikipedia-specific pages. In addition, editors regulate the changes made to the Wikipedia pages and can block edits and/or limit the rights to edit pages to only a small group of individuals. Alexa Toolbar, which is software that can be installed as a plug-in to Internet Explorer, enables a user to receive information about a website the user is visiting, such as the popularity of the site or other historic information. Alexa Toolbar does not, however, allow the user to edit or modify the actual content or presentation of the website in any manner. Similarly, Skweezer can be used to reformat and compress Web content in a manner that reduces the target page's file size and makes the downloaded content easier to view on a small screen. Skweezer, like Alexa Toolbar, however, does not allow the user, him- or herself, to edit or modify the content or presentation of the website.

There are many scenarios where it would be beneficial for an individual to be able to edit the information associated with a website he or she visits. For instance, an individual may want to comment on the accuracy of something included in a website, or elaborate on something that was not clearly conveyed by the creator of the website. Enabling individuals to edit the information relating to a webpage enables other individuals to obtain community verified information in addition to proprietary information without any extra effort; thus reducing the number of additional background queries necessary to check the accuracy and completeness of web information.

A need, therefore, exists for a technique that would allow individuals to freely edit any website he or she visits, and to share his or her edits with others.

BRIEF SUMMARY

In general, exemplary embodiments of the present invention provide an improvement over the known prior art by, among other things, providing a system for allowing individuals to edit the information relating to virtually any Uniform Resource Identifier (URI) accessible via a communication network (e.g., a wide area network (WAN) or wireless wide area network (WWAN), such as the Internet, or a local area network (LAN) or wireless local area network (WLAN), such as a private Intranet, just to name a few). According to exemplary embodiments, upon requesting access to a particular webpage, a user may be presented with two views associated with that webpage—a main view including the content of the original, non-editable webpage and an editable view, which is synchronized to the main view and includes a publicly editable webpage associated with the requested page. Using the editable webpage, the user can make comments regarding the requested, non-editable webpage, provide additional information that was not included in the requested web page by the creator, and the like. The user's edits may then be saved to the editable web page, such that others are able to view the edits made in their editable view.

In accordance with one aspect, a method is provided for providing a user with an editable webpage. In one exemplary embodiment, the method may include: (1) receiving a request for an editable webpage corresponding to a non-editable webpage, wherein the request includes an identifier associated with the non-editable webpage; (2) identifying the editable webpage corresponding to the non-editable webpage based at least in part on the identifier received; and (3) enabling access to the editable webpage.

In accordance with another aspect, a system is provided for providing a user with an editable webpage. In one exemplary embodiment, the system may include a user device configured to transmit a request for an editable webpage corresponding to a non-editable webpage, wherein the request includes an identifier associated with the non-editable webpage. The system may further include an indexing web server configured to receive the request via a network, identify the editable webpage corresponding to the non-editable webpage based at least in part on the identifier received, and enable access to the editable webpage by the user device.

According to yet another aspect, a network entity is provided for providing a user with an editable webpage. In one exemplary embodiment, the network entity may include a processor and a memory in communication with the processor that stores an application executable by the processor, wherein the application is configured, upon execution, to: (1) receive a request for an editable webpage corresponding to a non-editable webpage, wherein the request includes an identifier associated with the non-editable webpage; (2) identify the editable webpage corresponding to the non-editable webpage based at least in part on the identifier received; and (3) enable access to the editable webpage.

In accordance with yet another aspect, a computer program product is provided for providing a user with an editable webpage. The computer program product contains at least one computer-readable storage medium having computer-readable program code portions stored therein. The computer-readable program code portions of one exemplary embodiment include: (1) a first executable portion for receiving a request for an editable webpage corresponding to a non-editable webpage, wherein the request includes an identifier associated with the non-editable webpage; (2) a second executable portion for identifying the editable webpage corresponding to the non-editable webpage based at least in part on the identifier received; and (3) a third executable portion for enabling access to the editable webpage.

According to another aspect, an apparatus is provided for providing a user with an editable webpage. In one exemplary embodiment the apparatus includes a processor and a memory in communication with the processor that stores an application executable by the processor, wherein the application is configured, upon execution, to: (1) transmit a request for a non-editable webpage, wherein the request includes an identifier associated with the non-editable webpage; (2) receive an editable webpage corresponding to the non-editable webpage; and (3) display the editable and non-editable webpages simultaneously.

In accordance with yet another aspect, another computer program product is provided for providing a user with an editable webpage. The computer program product contains at least one computer-readable storage medium having computer-readable program code portions stored therein. The computer-readable program code portions of this exemplary embodiment include: (1) a first executable portion for transmitting a request for a non-editable webpage, wherein the request includes an identifier associated with the non-editable webpage; (2) a second executable portion for receiving an editable webpage corresponding to the non-editable webpage; and (3) a third executable portion for displaying the editable and non-editable webpages simultaneously.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Figure 1A:
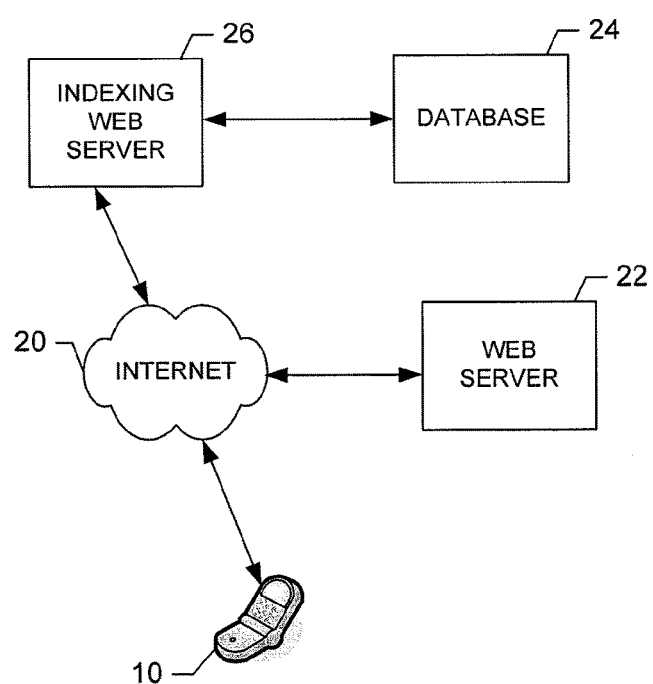
FIGS. 1A and 1B are block diagrams of one type of system that would benefit from exemplary embodiments of the present invention.

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide a method, system, apparatus, network entity and computer program product for providing users with an editable webpage corresponding to virtually any non-editable webpage that is capable of being accessed by the user.

According to one exemplary embodiment, the web browser operating on the user's device may be modified, either directly or through a plug-in, in order to automatically provide an editable webpage for each URI input by the user. According to this embodiment, when a user inputs a URI associated with a webpage he/she would like to visit (e.g., on the Internet or an Intranet), his or her browser will automatically send a request to an indexing web server for an editable page associated with the input URI. The indexing web server of one exemplary embodiment may access a mapping of URIs to editable web pages, and provide the browser with the URI for the corresponding editable webpage, or the editable webpage itself. The browser may then provide two views to the user—a main view including the requested, non-editable webpage, and an editable view including the publicly editable web page associated with the input URI. In one exemplary embodiment, the views may be shown simultaneously, or, in another exemplary embodiment, the views may be toggled using, for example, tabs or icons. Where the views are shown simultaneously, the views may be locked together, such that when the user scrolls up or down on one view, the other view will also move.

In one exemplary embodiment, rather than modifying or adding to an existing web browser operating on the user's device, a separate software program may be independently operating on the device in order to provide the editable webpages discussed above. In this exemplary embodiment, the separate software program may listen to the browser, and each time the user browses to a new URI, the separate software may automatically request the new editable webpage from the indexing web server and present it to the user. In this way, the new software and the conventional web browser may be synchronized.

In another exemplary embodiment wherein the user's existing web browser need not be modified in order to provide the user with an editable webpage, a browser service may be employed. In particular, in order to obtain the editable web page, the user may need to access a separate browsing service configured to provide the user with a webpage that is associated with a requested URI and contains two views including the original, non-editable page and the editable page. In this exemplary embodiment, in order to receive an editable webpage, the user may connect to the browser service and then input the URI of the non-editable webpage for which the user wishes to receive an editable webpage, rather than connecting directly to the non-editable webpage. In this manner, the browser service, which could be provided by a web proxy server, acts as a proxy between the user device and the Internet, or similar communication network, by allowing the user to browse the Internet via the browser service but providing additional value i.e., an editable webpage as well as the original non-editable webpage.

Figure 1B:
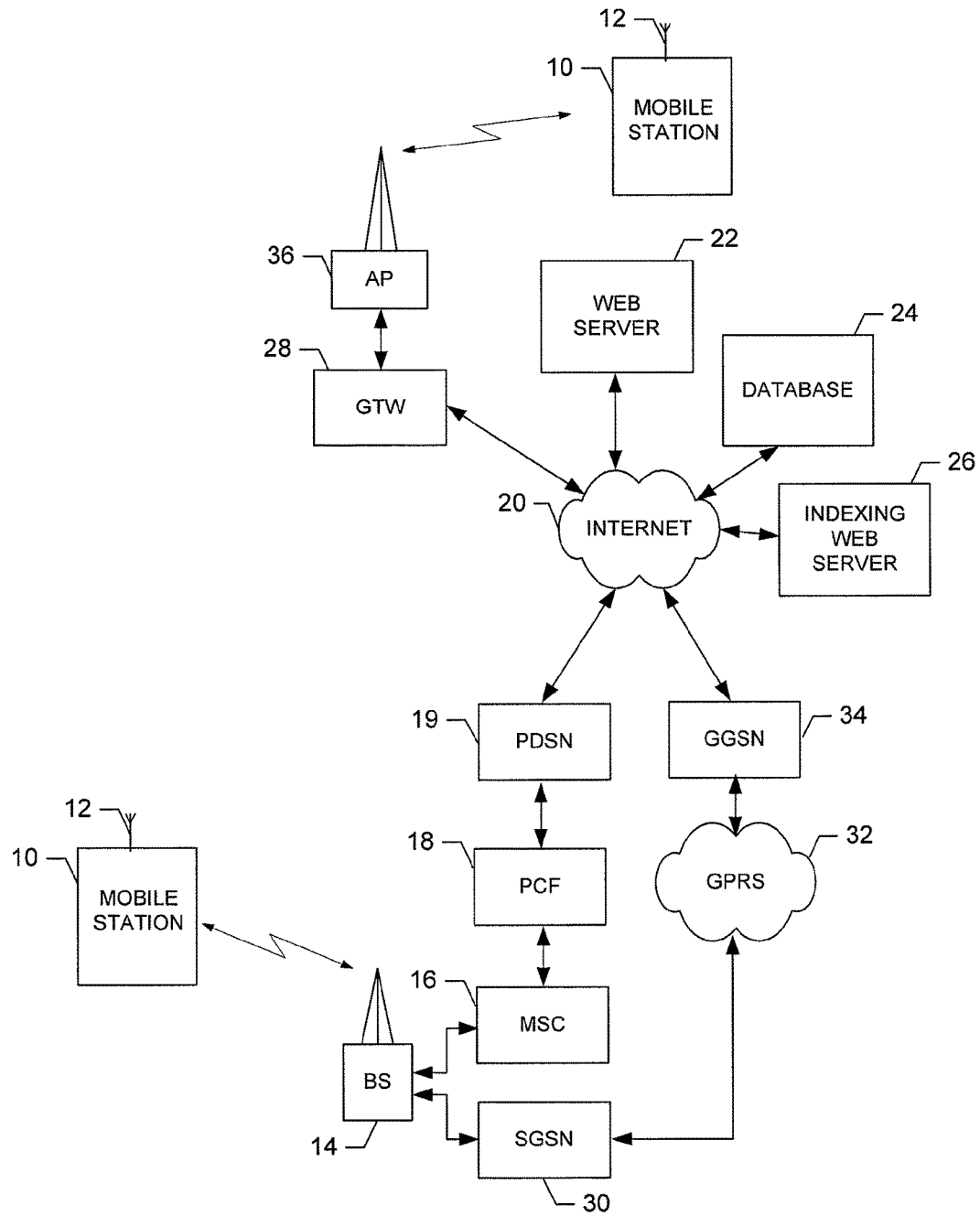

Overall System:

Referring to FIGS. 1A and 1B, an illustration of one type of system that would benefit from exemplary embodiments of the present invention is provided. As shown in FIG. 1A, the system of one exemplary embodiment may include an electronic device 10 (e.g., personal computer (PC), laptop, cellular telephone, personal digital assistant (PDA), and the like), an example of which is discussed in more detail below with regard to FIG. 3, in communication with one or more web servers 22 over a communications network 20 (e.g., WAN, WWAN, LAN, WLAN, and the like) for the purpose of downloading webpages. The system may further include an indexing web server 26, an example of which is discussed in more detail below with regard to FIG. 2, and which is also capable of being accessed by the electronic device 10 over the same or different communication network 20.

According to one exemplary embodiment, the indexing web server 26 may be configured to map one or more Uniform Resource Identifiers (URIs) associated with various webpages provided by the web servers 22 with a corresponding publicly editable webpage. The resulting mapping may, thereafter, be stored in a database 24 that is accessible by the indexing web server 26.

As discussed in more detail below with regard to FIG. 4, according to one exemplary embodiment, the indexing web server 26 and, more specifically, a processor operating on and executing software stored on the server 26, may be configured to receive a request for an editable webpage from the electronic device 10, wherein the request may include the URI of a non-editable webpage. Upon receipt, the indexing server 26 may access the mapping stored on the database 24 in order to identify the editable webpage corresponding to the URI included in the request. Where the editable webpage exists and has been mapped to the non-editable webpage URI, the indexing web server 26 may transmit the URI of the editable webpage to the electronic device 10, which can then download the editable webpage from the web server 22. Alternatively, the electronic device 10 may be capable of downloading the editable webpage directly from the indexing web server 26.

Where no editable web page exists, or has been previously mapped to the URI included in the request received, the indexing web server 26 of one exemplary embodiment may, instead, transmit the URI of a known, publicly editable webpage associated with the non-editable webpage, such as a Wikipedia page. If and when changes are made to the known, publicly editable webpage, the indexing web server 26 may save the edited version of the editable page as a new editable page, and map the resulting webpage to the URI of the non-editable webpage in the mapping of database 24 for providing the new editable webpage to subsequent users. In another exemplary embodiment, where no editable webpage exits, or has been previously mapped to the URI included in the request received, the indexing web server 26 may create a new editable webpage, save the new editable webpage in the mapping of the database 24, and transmit the URI of the new editable page (or the editable webpage itself) to the electronic device 10. The content of the new editable webpage may, in one exemplary embodiment, be blank or empty. Alternatively, the content may be copied from a known, publicly editable webpage associated with the non-editable webpage (e.g., a Wikipedia page).

According to one exemplary embodiment, the electronic device 10 may comprise a new or modified web browser, or an application operating in conjunction with a conventional web browser, that is configured, upon execution by a processor operating on the electronic device 10, to receive the editable page, or the URI of the editable page, from the indexing web server 26 and present the editable page, in addition to the non-editable page, to the user. In another exemplary embodiment, the electronic device 10 may be required to connect to a browser service (i.e., a web service that allows the user to browse the Internet, or similar communication network, and provides additional value), for example provided by a web proxy server, in order to receive access to the editable webpage from the indexing web service. Regardless of how the editable and non-editable webpages are accessed, in one exemplary embodiment, both pages may be displayed in separate views including, for example, a main view including the content of the non-editable webpage and an editable view including the content of the editable webpage. The views may be presented simultaneously using a split screen (e.g., split horizontally or vertically) or on two separate displays. Alternatively, the two views may be toggled using, for example, tabs or icons. In one exemplary embodiment, presentation of the editable webpage may be synchronized with the presentation of the non-editable webpage. In other words, as the user navigates through various webpages, the editable view may be automatically updated with the corresponding editable pages, without the user having to take any extra steps.

Referring now to FIG. 1B, a more detailed illustration of one type of system that would benefit from exemplary embodiments of the present invention is provided. As shown in FIG. 1B, the system can include one or more electronic devices, such as mobile stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like) can be coupled to the mobile station 10 via the Internet. For example, the processing elements can include the indexing web server 26 and/or the web server 22, discussed above. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95

(CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 (as well as one or more processing elements, although not shown as such in FIG. 1B) can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including Wireless LAN (WLAN) techniques. The APs may be coupled to the Internet 20. Like with the MSC 16, the AP's can be directly coupled to the Internet. In one embodiment, however, the APs are indirectly coupled to the Internet via a GTW 28. As will be appreciated, by directly or indirectly connecting the mobile stations and the processing elements (e.g., indexing web server 26, database 24, and/or web server 22) and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1B, in addition to or in lieu of coupling the mobile stations 10 to one or more processing elements (e.g., the indexing web server 26, database 24, and/or the web server 22) across the Internet 20, one or more such entities may be directly coupled to one another. As such, one or more network entities may communicate with one another in accordance with, for example, RF, BT, IrDA or any of a number of different wireline or wireless communication techniques, including LAN and/or Wireless LAN techniques. Further, the mobile station 10 and the processing elements can be coupled to one or more electronic devices, such as printers, digital projectors and/or other multimedia capturing, producing and/or storing devices (e.g., other terminals).

Figure 2:
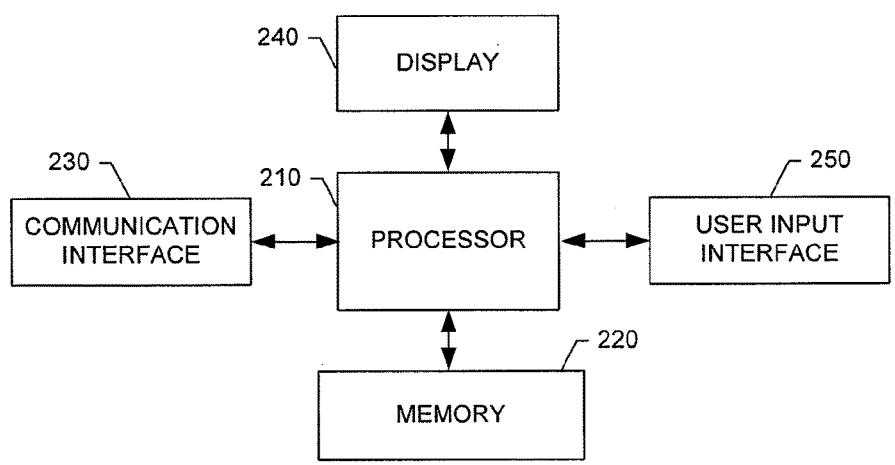
FIG. 2 is a schematic block diagram of an entity capable of operating as an indexing web server in accordance with exemplary embodiments of the present invention.

Indexing Web Server & User Device:

Referring now to FIG. 2, a block diagram of an entity capable of operating as an indexing web server 26 is shown in accordance with one embodiment of the present invention. The entity capable of operating as an indexing web server 26 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. As shown, the entity capable of operating as an indexing web server 26 can generally include means, such as a processor 210 connected to a memory 220, for performing or controlling the various functions of the entity. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention. In particular, the memory of one exemplary embodiment may store an application configured, upon execution, to receive a request for an editable webpage associated with a particular non-editable webpage; identify the editable webpage (e.g., by accessing a mapping of non-editable webpage URIs to editable webpages, by creating a new editable webpage, or by identifying a known, publicly editable webpage associated with the non-editable webpage, such as a Wikipedia page); and provide an electronic device with access to the editable webpage (e.g., by transmitting the URI of the editable page, or by enabling the electronic device to download the editable page directly from the indexing web server 26).

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Figure 3:
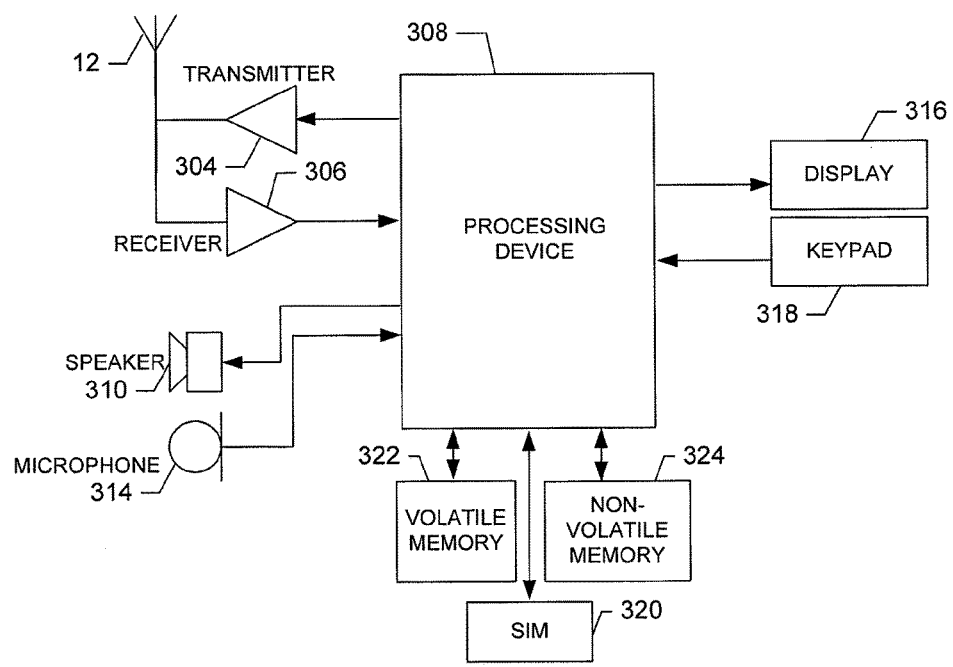
FIG. 3 is a schematic block diagram of a mobile station capable of operating in accordance with an exemplary embodiment of the present invention.

Reference is now made to FIG. 3, which illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 3, in addition to an antenna 302, the mobile station 10 includes a transmitter 304, a receiver 306, and means, such as a processing device 308, e.g., a processor, controller or the like, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory.

For example, the controller may be capable of operating a connectivity program, such as a conventional Web browser. The connectivity program may then allow the mobile station to transmit and receive Web content, such as according to HTTP and/or the Wireless Application Protocol (WAP), for example. As discussed above, with regard to FIG. 1A, the conventional web browser operating on the mobile device may be modified and/or include a plug-in, such that the web browser is configured to automatically retrieve and display an editable webpage corresponding to a non-editable webpage also retrieved and displayed by the web browser. Alternatively, in one exemplary embodiment, a separate software program may operate in conjunction with and be synchronized to the conventional web browser in order to request an editable webpage each time a user browses to a new URI using the conventional web browser. In yet another exemplary embodiment, the controller may be capable of operating a separate browser service, in addition to the conventional web browser, wherein the separate browser service (e.g., provided by a web proxy server), upon connection thereto by the user, acts as a proxy between the user and the Internet, or other communication network, to retrieve and display an editable webpage corresponding to each non-editable webpage retrieved and displayed. As one of ordinary skill in the art will recognize, use of a plug-in, separate application or separate browser service, instead of directly modifying the conventional web browser, may be preferable where a user has a preferred web browser, such as Internet Explore, Netscape, or Firefox, to name a few.

The mobile station may also comprise means such as a user interface including, for example, a conventional earphone or speaker 310, a ringer 312, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for receiving a URI input by a user via, for example, the keypad 318; downloading a non-editable webpage associated with the URI via, for example, the Web browser discussed above; transmitting a request for an editable webpage corresponding to the URI, for example, to the indexing web server 26; downloading the corresponding editable page; and displaying the non-editable and editable pages to the user on the same screen (i.e., a split screen), or on separate screens capable of being toggled.

Figure 4:
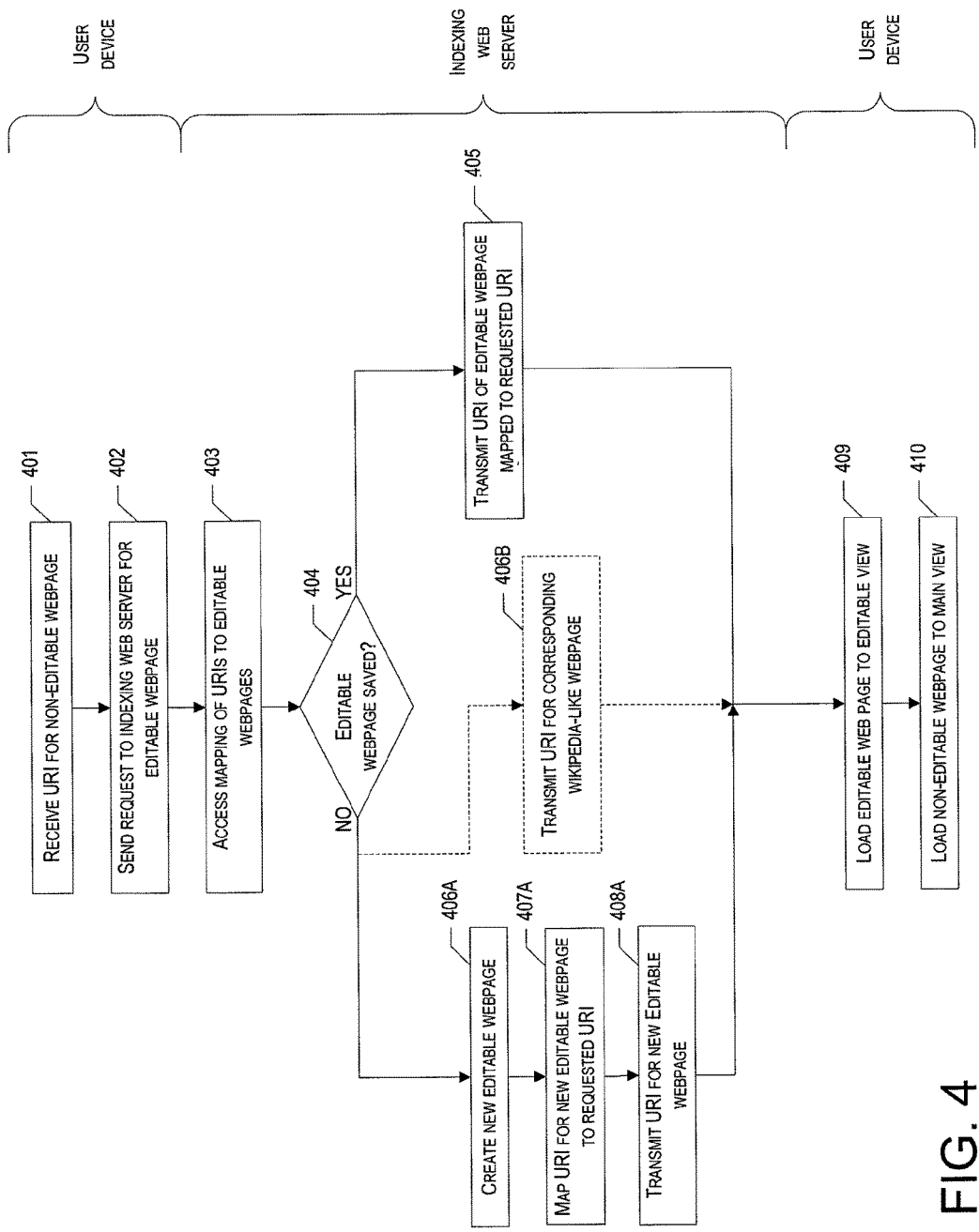
FIG. 4 is a flow chart illustrating the steps which may be taken in order to provide a user with an editable webpage in accordance with exemplary embodiments of the present invention.

Method of Providing Editable Webpages:

Reference is now made to FIG. 4, which illustrates the steps which may be taken in order to provide a user with an editable webpage in accordance with exemplary embodiments of the present invention. As shown, the process may begin at Step 401 where a user inputs a URI (e.g., http://nokia.com) into the web browser operating on his or her user device (e.g., via a keypad, mouse or other input device). Upon receipt of the URI, the web browser of one exemplary embodiment, or a separate software program operating in synchronization with the web browser of another exemplary embodiment, may send a request for the editable webpage corresponding to and including the entered URI to an indexing web server. The indexing web server, in turn, will identify and provide access to the corresponding editable webpage, for example in the manner discussed below. The URI associated with the indexing web server could, for example, be http://editablewww.com, while the request may include the URI http://editablewww.com/http://nokia.com.

In one exemplary embodiment, due to privacy issues, the user device may first strip a dynamic URI before transmitting the URI to the indexing web server. For example, the user device may change the URI http://www.somesites.com/ forums/thread.php?threadid=12345&sort=date to http://www.somesites.com/forums/thread.php. Alternatively, in another exemplary embodiment, the user device may be configured so that it does not send URI's with "https" to the indexing web server at all for retrieval of a corresponding editable webpage. In this exemplary embodiment, the user device may instead indicate to the user that no editable webpage is available for the secured content. In yet another exemplary embodiment, the attributes after "?" of a dynamic URI could be blurred or hashed so that attributes are replaced with a unique replacement, but in such a way that the original attributes cannot be solved from the hashed version of the attributes.

In one exemplary embodiment, in order to identify the editable webpage, the indexing web server may, at Step 403, access a mapping of URIs associated with non-editable webpages to publicly editable webpages (or URIs associated with editable webpages). If it is determined, at Step 404, that a publicly editable webpage exists and has previously been mapped to the URI included in the request sent by the user device in Step 402, the indexing web server will, in one exemplary embodiment, transmit the URI associated with the corresponding editable webpage to the user device in Step 405. In one exemplary embodiment, if there is no editable page corresponding to a "deep" URI (e.g., http://nokia.fi/puhelimet/puhelinmallit/), a webpage corresponding to a shorter URI (e.g., http://nokia.fi) could be used instead. Upon receipt of the URI associated with the corresponding editable webpage, the user device may use the transmitted URI to download the editable page from one of the web servers 22 discussed above. Alternatively, the editable webpage may be provided directly from the indexing web server 26 to the user device 10.

On the other hand, where it is determined in Step 404 that no publicly editable web page exists or has been previously mapped to the requested URI, the indexing web server 26 of one exemplary embodiment may do one of two things. First, in one exemplary embodiment, the indexing web server 26 may automatically create a new editable webpage (Step 406A), link or map the new editable webpage to the requested URI in the database 24 (Step 407B), and transmit the URI of the newly created editable webpage to the user device (Step 408B). In one exemplary embodiment, the content of the new editable webpage may comprise, for example, the content of a Wikipedia- or Aboutus-like webpage. Alternatively, the editable webpage may begin as a blank page to be filled in by the various users in whatever manner they desire.

Second, according to another embodiment, the indexing web server may locate and transmit the URI associated with a known, publicly editable webpage that relates to the non-editable webpage, such as a Wikipedia page, rather than creating a new webpage. (Step 407A). While not shown in FIG. 4, in this exemplary embodiment, if and when edits are made, the indexing web server may, at that point, save the editable webpage separately from the original Wikipedia page, and then map this new editable webpage to the requested URI.

Once the URI of an editable webpage, whether previously created and mapped, newly created and mapped, or known and offered by other web services, has been provided to the user, the user device may load the non-editable webpage (Step 409), as well as the editable webpage (Step 410), and display the different webpages to the user in separate views (e.g., a main and an editable view). In one exemplary embodiment, the two views may be shown simultaneously in a split-screen presentation. Alternatively, the editable view may be behind the main view, wherein the two views may be toggled using, for example, tabs or icons. The latter method of presenting the views may be preferable for small screen applications, such as when using a cellular telephone, PDA, or other mobile device. In one exemplary embodiment, the editable view may contain one or more functions that allow the user to associate new editable content to a certain URI. These functions may be implemented, for example, using fields and/or buttons. To illustrate, in one exemplary embodiment the user may be capable of choosing which Wikipedia page is a good candidate to be indexed with a certain URI. The editable view may contain, for example, a field for inputting a new URI, and a clickable button for approving the new URI. In addition, the user may be able to choose an editable page of a shorter URI (e.g., http://nokia.fi) to be associated with a deeper URI (e.g., http://nokia.fi/puhelinmallit/), for example by clicking "one level up." In yet another exemplary embodiment, the editable webpage may contain code that modifies the non-editable page, such that when modifications are made to the non-editable webpage, the original non-editable webpage is replaced by the modified version non-editable webpage in the non-editable view. To illustrate, the editable webpage may contain a command to replace some code in the non-editable webpage (e.g., "REPLACE<img height=110 src="/intl/en_ALL/images/logo.gif" width=276>WITH<img height=110 src=http://www.example.com/images.example.gif width=276>"). In this way, the editable page would modify the way the browser shows the original non-editable webpage to the user.

While not shown in FIG. 4, the above sequence may be repeated each time the user clicks on a new link or inputs a new URI. Accordingly, the main and editable views of the user device may be synchronized as the user browses the Internet, or similar data network, without the user having to take any additional actions. In addition, in one exemplary embodiment, the non-editable and editable webpages may be locked to each other, such that when the user moves either of the views up or down, for example with a scrollbar, the other view will also move.

According to one exemplary embodiment, edits made to the editable page (e.g., comments, additional information that the website owner or creator neglected to include—inadvertently or intentionally, etc.) will be saved to the editable page, such that subsequent users viewing the editable page will be able to view the changes made by the user in the editable view on their devices. In one embodiment, the content of the editable webpage can be edited by anyone. Alternatively, editing rights may be limited to a group of people.

In one exemplary embodiment, the publicly editable pages may contain pointers, arrows, and the like that refer to the original page. For example, arrows from a section or point on the editable page to a portion of the original page could appear when a user points to or hovers over the section in the editable page. The references from an editable page to the original page could be marked in the editable page by using a special tag, e.g., '<arrow to ="tower" x=156, y=18>Eiffel tower</arrow>'. This would create an arrow from the phrase "Eiffel tower" in an editable page to the location of the tag containing text "tower" in the original source code. In this example, the tag refers to an image. The end of the arrow is finally adjusted by x=156 and y=18. In one exemplary embodiment, the arrow is drawn on the screen by the browser. Alternatively, the arrows could be on the screen using a scripting language such as JavaScript or using style sheets.

While also not shown in FIG. 4, in another exemplary embodiment, where a new browser service is created (i.e., rather than modifying or adding to an existing web browser application or adding a new application that operates in conjunction with the web browser application), a user may access the new browser service (e.g., provided by a web proxy server) in order to obtain the editable webpage. In this exemplary embodiment, the method may simply include a user accessing the browser service and inputting a URI, followed by the browser service translating the URI into a URI of a webpage having two views—one including the original, non-editable webpage, and the other including the editable page. The browser service, therefore, acts as a proxy between the user device and the Internet, or other communication network, allowing the user to browse the Internet via the browser service, while providing additional value (i.e., the editable webpage as well as the original non-editable webpage).

CONCLUSION

The system, method, network entity, apparatus and computer program product of exemplary embodiments of the present invention are primarily described in conjunction with mobile communications applications. It should be understood, however, that the system, method, network entity, apparatus and computer program product of embodiments of the present invention can be utilized in conjunction with a variety of other applications, both in the mobile communications industries and outside of the mobile communications industries. For example, the system, method, network entity, apparatus and computer program product of exemplary embodiments of the present invention can be utilized in conjunction with wireline and/or wireless network (e.g., Internet) applications.

As described above and as will be appreciated by one skilled in the art, embodiments of the present invention may be configured as a system, method, network entity or apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    determining to process a request to associate editable webpage content with non-editable webpage content for presentation on at least one user device through use of at least one network;
    based at least in part on the processing, determining to facilitate generation or identification, via an indexing web server, of editable webpage content associated with the non-editable webpage content, wherein facilitating generation or identification of the editable webpage content comprises automatically, without user intervention, accessing, via the indexing web server, a mapping of one or more identifiers associated with a respective one or more sets of non-editable webpage content to a respective one or more sets of editable webpage content, wherein the editable webpage content is for presentation on at least one user device via the at least one network and includes code that is configured to modify the non-editable webpage content; and
    determining to enable access by the at least one user device to the editable webpage content via the at least one network.

2. The method of claim 1, wherein facilitating generation or identification of the editable webpage content further comprises:
    determining to locate an identifier mapped to an identifier received via the request for the editable webpage content associated with the non-editable webpage content based at least in part on the identifier received via the request.

3. The method of claim 1, wherein the mapping further comprises mapping of the one or more identifiers associated with the respective one or more sets of non-editable webpage content to the respective one or more identifiers associated with the one or more sets of editable webpage content.

4. The method of claim 2, wherein facilitating generation or identification of the editable webpage content further comprises:
   determining to create a new set of editable webpage content associated with the non-editable webpage content, where the identifier received could not be mapped; and
   determining to map the new set of editable webpage content to the identifier received.

5. The method of claim 1, wherein the request for editable webpage content is received through the web from the at least one user device.

6. The method of claim 4, wherein the new set of editable webpage content is copied from a webpage associated with the non-editable webpage content.

7. The method of claim 2, wherein facilitating generation or identification of the editable webpage content further comprises:
   determining to identify content of a known, publicly available webpage associated with the non-editable webpage content, where the identifier received could not be located.

8. The method of claim 7, wherein enabling access to the editable webpage content comprises enabling access to the known, publicly available webpage associated with the non-editable webpage content, the known, publicly available webpage content is retrieved from a web-based collaborative encyclopedia.

9. The method of claim 1, wherein enabling access to the editable webpage content comprises transmitting an identifier associated with the editable webpage content.

10. The method of claim 1 further comprising:
    receiving from the user device a new version of the editable webpage content associated with the original editable webpage content, said new version including one or more edits; and
    determining to save the new version in place of a previously saved version of the editable webpage content.

11. The method of claim 1, further comprising: transmitting an identifier associated with the editable webpage content to the user device, wherein the identifier comprises a uniform resource identifier identifying the editable webpage content.

12. An indexing web server apparatus comprising:
    at least one processor; and
    at least one memory including computer program code for one or more programs, the at least one memory and the computer program code configured to, with the at least one processor, cause the apparatus to perform at least the following:
    determine to process a request to associate editable webpage content with non-editable webpage content for presentation on at least one user device through use of at least one network;
    based at least in part on the processing, determine to facilitate generation or identification of editable webpage content associated with the non-editable webpage content, wherein to facilitate generation or identification of the editable webpage content comprises automatically, without user intervention, accessing a mapping of one or more identifiers associated with a respective one or more sets of non-editable webpage content to a respective one or more sets of editable webpage content, wherein the editable webpage content is for presentation on at least one user device via the at least one network and includes code that is configured to modify the non-editable webpage content; and
    determine to enable access by the at least one user device to the editable webpage content via the at least one network.

13. The apparatus of claim 12, wherein the at least one memory and the computer program code are further configured to, with the at least one processor, cause the apparatus to:
    determine to locate an identifier mapped to an identifier received via the request for the editable webpage content associated with the non-editable webpage content based at least in part on the identifier received via the request.

14. The apparatus of claim 13, wherein the at least one memory and the computer program code are further configured to, with the at least one processor, cause the apparatus to:
    determine to create a new set of editable webpage content associated with the non-editable webpage content, where the identifier received could not be mapped; and
    determine to map the new set of editable webpage content to the identifier received.

15. The apparatus of claim 13, wherein the at least one memory and the computer program code are further configured to, with the at least one processor, cause the apparatus to:
    determine to identify content of a known, publicly available webpage as the editable webpage content associated with the non-editable webpage content, where the identifier received could not be located, the known, publicly available webpage content is retrieved from a web-based collaborative encyclopedia.

16. The apparatus of claim 12, wherein the editable webpage content associated with the non-editable webpage content is identified based at least in part on an identifier received via the request.

17. The apparatus of claim 12, wherein the at least one memory and the computer program code are further configured to, with the at least one processor, cause the apparatus to:
    receive a new version of the editable webpage content associated with the original editable webpage content, said new version including one or more edits; and
    determine to save the new version in place of a previously saved version of the editable webpage content.

18. A computer program product comprising a non-transitory computer-readable storage medium having computer-readable program code portions stored therein, the computer-readable program code portions comprising computer-executable program code portions which, when executed by one or more processors, cause an indexing web server apparatus to at least perform the following:
    determine to process a request to associate editable webpage content with non-editable webpage content for presentation on at least one user device through use of at least one network;
    based at least in part on the processing, determine to facilitate generation or identification of editable webpage content associated with the non-editable webpage content, wherein facilitating generation or identification of the editable webpage content comprises automatically, without user intervention, accessing, via the indexing web server, a mapping of one or more identifiers associated with a respective one or more sets of non-editable webpage content to a respective one or more sets of editable webpage content, wherein the editable webpage content is for presentation on at least one user device via the at least one network and includes code that is configured to modify the non-editable webpage content; and determine to enable access by the at least one user device to the editable webpage content via the at least one network.

19. The computer program product of claim 18, wherein the computer-readable program code portions further comprise computer-executable program code portions to cause the apparatus to:

determine to locate an identifier mapped to an identifier received via the request for the editable webpage content associated with the non-editable webpage content based at least in part on the identifier received via the request.

20. The computer program product of claim 19, wherein the computer-readable program code portions further comprise computer-executable program code portions to cause the apparatus to:

determine to create a new set of editable webpage content associated with the non-editable webpage content, where the identifier received could not be mapped; and determine to map the new set of editable webpage content to the identifier received.

21. The computer program product of claim 19, wherein the computer-readable program code portions further comprise computer-executable program code portions to cause the apparatus to:

determine to identify content of a known, publicly available webpage as the editable webpage content associated with the non-editable webpage content, where the identifier received could not be located, the known, publicly available webpage content is retrieved from a web-based collaborative encyclopedia.

22. The computer program product of claim 18, wherein the computer-readable program code portions further comprise computer-executable program code portions to cause the apparatus to:

receive a new version of the editable webpage content, said new version including one or more edits; and determine to save the new version in place of a previously saved version of the editable webpage content.

23. A method of facilitating access to at least one interface configured to allow access to at least one service, said method being performed by an indexing web server operable in conjunction with at least one user device, said method comprising:

determining to process a request to associate editable webpage content with non-editable webpage content for presentation on at least one user device through use of at least one network;

based at least in part on the processing, determining to facilitate generation or identification of editable webpage content associated with the non-editable webpage content, wherein facilitating generation or identification of the editable webpage content comprises automatically, without user intervention, accessing, via the indexing web server, a mapping of one or more identifiers associated with a respective one or more sets of non-editable webpage content to a respective one or more sets of editable webpage content, wherein the editable webpage content is for presentation on at least one user device via the at least one network and includes code that is configured to modify the non-editable webpage content; and determining to enable access by the at least one user device to the editable webpage content via the at least one network.

24. The method of claim 23, wherein facilitating generation or identification of the editable webpage content comprises:

determining to locate an identifier mapped to an identifier received via the request for the editable webpage content associated with the non-editable webpage content based at least in part on the identifier received via the request.

25. The method of claim 23, wherein the mapping further comprises mapping of the one or more identifiers associated with the respective one or more sets of non-editable webpage content to the respective one or more identifiers associated with the one or more sets of editable webpage content.

26. The method of claim 24, wherein facilitating generation or identification of the editable webpage content further comprises:

determining to create a new set of editable webpage content associated with the non-editable webpage content, where the identifier received could not be mapped; and determining to map the new set of editable webpage content to the identifier received.

27. The method of claim 23, wherein the request for editable webpage content is received through the web from the at least one user device.

28. The method of claim 26, wherein the new set of editable webpage content is copied from a webpage associated with the non-editable webpage content.

29. The method of claim 24, wherein facilitating generation or identification of the editable webpage content further comprises:

determining to identify content of a known, publicly available webpage associated with the non-editable webpage content, where the identifier received could not be located.

30. The method of claim 29, wherein enabling access to the editable webpage content comprises enabling access to the known, publicly available webpage associated with the non-editable webpage content, the known, publicly available webpage content is retrieved from a web-based collaborative encyclopedia.

31. The method of claim 23, wherein enabling access to the editable webpage content comprises determining to transmit an identifier associated with the editable webpage content.

32. The method of claim 23, further comprising:

receiving from the user device a new version of the editable webpage content associated with the original editable webpage content, said new version including one or more edits; and determining to save the new version in place of a previously saved version of the editable webpage content.

33. The method of claim 23, further comprising: determining to transmit an identifier associated with the editable webpage content to the user device, wherein the identifier comprises a uniform resource identifier identifying the editable webpage content.

34. The method of claim 1, wherein the editable webpage content includes the code that is configured to modify the non-editable webpage content by a browser plug-in.

35. The method of claim 34, wherein the browser plug-in is further configured to replace the original non-editable webpage content with the modified non-editable webpage content.

\* \* \* \* \*